United States Patent [19]

Reynolds

[11] Patent Number: 5,103,952
[45] Date of Patent: Apr. 14, 1992

[54] PRE-ENGERGIZER FOR ONE-WAY SYNCHRONIZER

[75] Inventor: Joseph D. Reynolds, Climax, Mich.

[73] Assignee: Eaton Corporation, Cleveland, Ohio

[21] Appl. No.: 633,739

[22] Filed: Dec. 24, 1990

[51] Int. Cl.$^5$ ............................................. F16D 23/06
[52] U.S. Cl. ................................. 192/53 E; 192/53 F; 74/339
[58] Field of Search ............. 74/339; 192/53 E, 53 G, 192/53 F

[56] References Cited

U.S. PATENT DOCUMENTS

| | | | |
|---|---|---|---|
| 2,410,511 | 11/1946 | Letsinger | 192/53 F |
| 2,896,760 | 7/1959 | Hebbinghaus | 192/53 F |
| 2,978,083 | 4/1961 | Henyon | 192/114 R |
| 3,137,376 | 6/1964 | Schick | 74/339 X |
| 3,221,851 | 12/1965 | Vandervoort | 192/53 R |
| 3,548,983 | 12/1970 | Hiraiwa | 192/53 F |
| 3,804,218 | 4/1974 | Krutashov | 192/53 E |
| 3,860,101 | 1/1975 | De Feo et al. | 192/53 G X |
| 3,910,390 | 10/1975 | Eichinger | 192/53 E |
| 4,018,319 | 4/1977 | Thomas | 192/53 E |
| 4,162,001 | 6/1979 | Yant | 192/53 E |
| 4,413,715 | 11/1983 | Michael et al. | 192/53 F |
| 4,462,489 | 7/1984 | Morscheck | 192/53 E |
| 4,796,741 | 1/1989 | Loeffler | 192/53 E |
| 4,836,348 | 6/1989 | Knödel et al. | 192/53 F |
| 4,869,353 | 9/1989 | Ohtsuki et al. | 192/53 F |
| 4,905,806 | 3/1990 | Hillenbrand et al. | 74/339 X |
| 4,989,706 | 2/1991 | Morscheck | 192/53 E |

Primary Examiner—Richard Lorence
Assistant Examiner—David E. Henn
Attorney, Agent, or Firm—P. S. Rulon

[57] ABSTRACT

A pin-type, double-acting, one-way synchronizer mechanism (22) with friction clutches (24,36 and 26,38), jaw clutches (28,12c and 30,16b) and self-energizing ramps. The ramps act between a shaft (14) and a shift flange (32) which is rotataable relative to the shaft and jaw clutch members 28,30. Flange (32) includes radially inwardly extending teeth (32k) defining self-energizing ramps (32m,32n) which act against ramps (14d,14e) formed in shaft splines (14b). The angles of the self-energizing ramps may be varied to provide substantially the same synchronizing time for several or all of the ratio gears in a multi-ratio transmission. Two of the friction clutches (36,38) each include three circumferentially spaced pins (40,41) rigidly extending therefrom and through openings (32c,32d) in the flange (32). The pins include blocker shoulders (40c,41c) which, when nonconcentrically disposed in their respective flange openings respectively engage flange blocker shoulders (32e,32f) for respectively engaging the two friction clutches (36,38) in response to initial axial engaging movement of the flange (32) and for preventing asynchronous engagement of the jaw clutches. The flange (32) carries three spring assemblies (42) which bias the pins (40,41) to the nonconcentric positions in their respective flange openings (32c,32d).

8 Claims, 3 Drawing Sheets

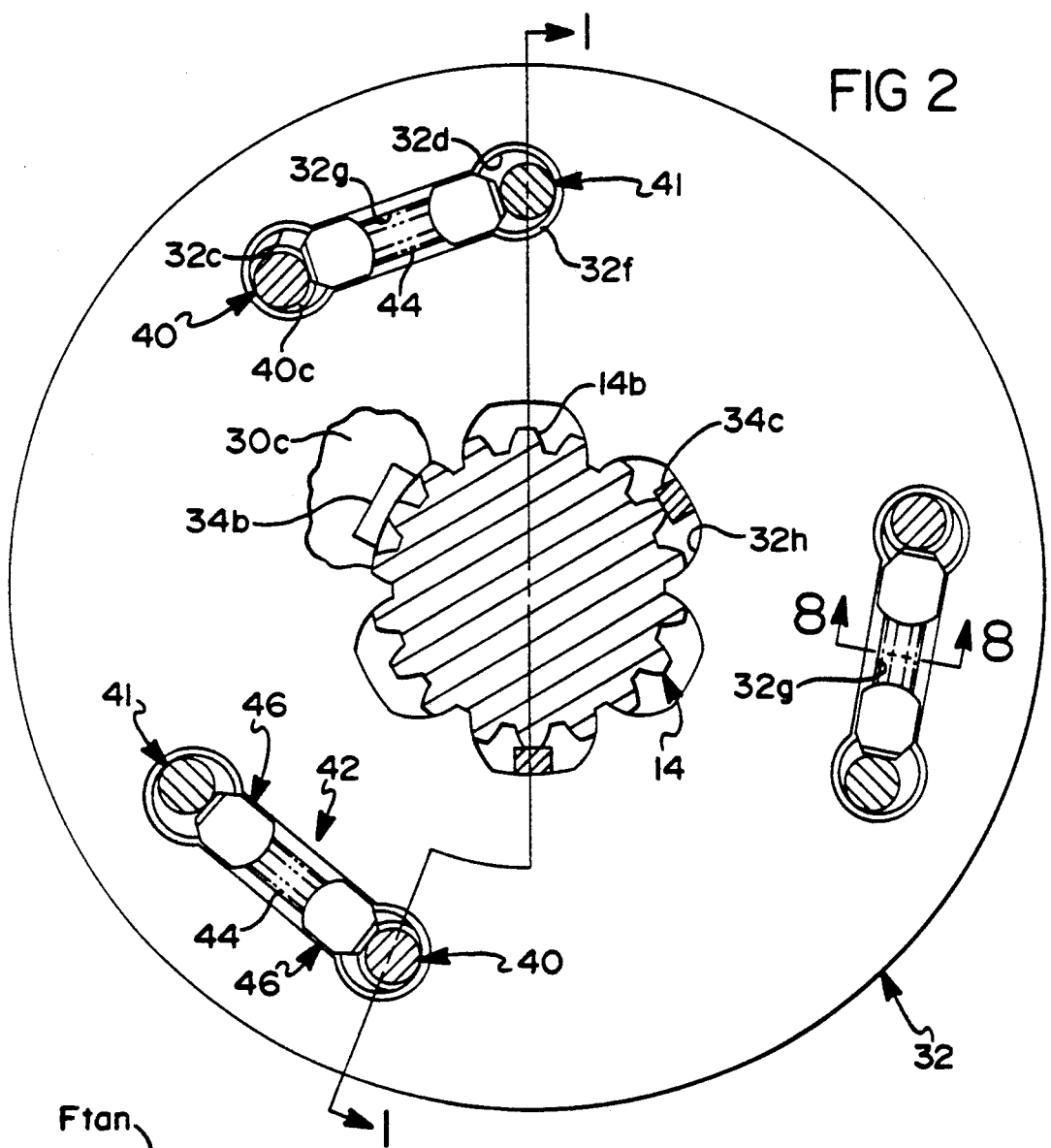
FIG 2
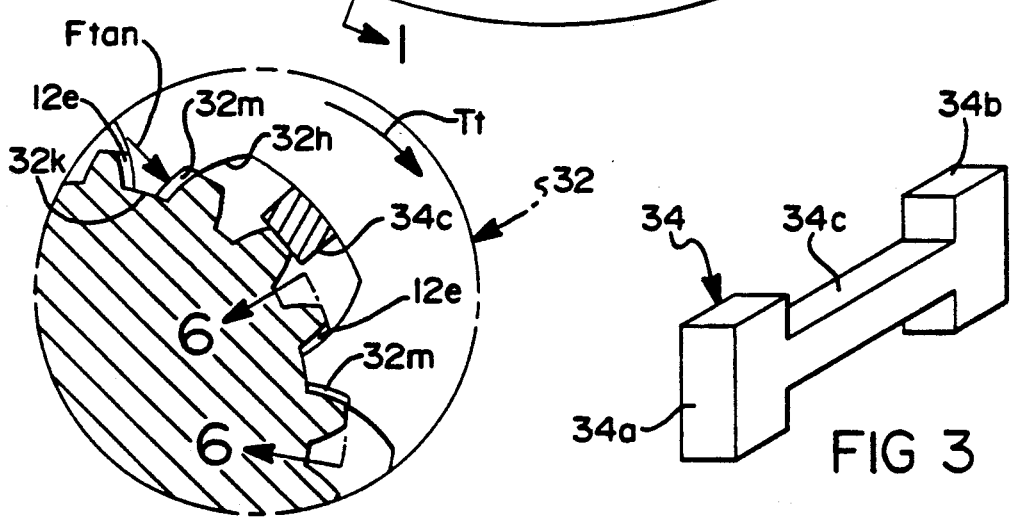
FIG 4
FIG 3

5,103,952

PRE-ENGERGIZER FOR ONE-WAY SYNCHRONIZER

CROSS-REFERENCE TO RELATED APPLICATIONS

This application is related to U.S. application Ser. Nos. 632,880, 632,881, 632,882, 632,883, 632,884, 633,703, 633,704, 633,738, 633,743, 633,744, all filed Dec. 24, 1990, all assigned to the assignee of this application, and all incorporated herein by reference.

FIELD OF THE INVENTION

This invention relates to a pre-energizer assembly for a synchronizer mechanism employed in a multi-ratio transmission. Additionally, the invention relates to pre-energizer assemblies for synchronizer mechanisms of the self-energizing type.

BACKGROUND OF THE INVENTION

It is known to provide pin-type synchronizer mechanisms which include means selectively operative to frictionally synchronize and then positive clutch first and second members to a third member, and which include blocker means for preventing the positive clutching during synchronization. It is also known to provide such synchronizer mechanisms for transmissions wherein the first member always rotates faster than the third member and the third member always rotates faster than the second member, and wherein the blocker means are continuously biased to a position for preventing the positive clutching. Such a synchronizer mechanism is disclosed in U.S. Pat. No. 3,221,851 and is incorporated herein by reference.

The synchronizer mechanism of the above-mentioned patent includes first and second friction and jaw clutch assemblies, a plurality of pins rigidly extending from a friction ring of each friction assembly and through openings in a radially extending shift flange, pre-energizer assemblies for engaging the friction assemblies in response to initial engaging movement of the flange, blockers defined by shoulders on the pins and about the flange openings for preventing asynchronous engagement of the jaw members.

It is also well known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for heavy duty trucks. Prior art examples of such mechanisms may be seen by reference to U.S. Pat. Nos. 2,410,511, 2,896,760, 3,548,983, 4,413,715, 4,836,348, and 4,869,353, which are incorporated herein by reference.

The synchronizer mechanisms of the above patents include friction and jaw members for respectively synchronizing and positive clutching a gear to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof; and self-energizing ramps reacting the torque to provide an additional force in the direction of and additive to the shift force for further increasing the synchronizing torque of the friction members.

SUMMARY OF THE INVENTION

An object of this invention is to provide a one-way, pin-type synchronizer mechanism with an improved spring means arrangement for insuring correct blocker shoulder alignment or engagement.

Another object of this invention is to provide a one-way, pin-type synchronizer mechanism with self-energizing means.

According to a feature of the inventio, a pin-type synchronizer mechanism, as disclosed in U.S. Pat. No. 3,221,851, synchronizes and positive clutches first and second axially spaced apart members to a shaft. The mechanism comprises first and second annular and axially spaced apart friction rings which are respectively engagable to frictionally connect the first and second members to the shaft in response to a shift force effecting initial axial engaging movement of a radially extending flange from a neutral position toward the first and second friction rings. The flange is axially disposed between the friction rings and is drivingly connected to the shaft by connection means. A jaw clutch positive clutches the members to the shaft in response to further engaging movement of the flange. Each friction ring includes at least one pin rigidly extending axially therefrom and through circumferentially spaced openings in the flange. Each pin has a reduced diameter portion allowing limited relative rotation between the flange and the associated pin. A spring assembly biases the pins circumferentially in opposite directions toward nonconcentric positions in the associated openings. Each opening and associated pin includes blocker shoulders engagable when the pins are in the nonconcentric positions. The engaged shoulders transmit the initial engaging movement of the flange and the shift force to engage the friction ring that the associated pin extends from. The engaged shoulders also prevent the further movement of the flange until substantial synchronization is reached. The engaged friction means produces a synchronizing torque which reacts to the flange via the pins in a direction for maintaining engagement of the blocker shoulders. The blocker shoulders have surfaces which produce a torque counter to the synchronizing torque for unblocking the engaged shoulders in response to substantial synchronization being reached.

The invention is characterized by:
the flange having a slot extending axially through axially opposite end faces of the flange and having opposite ends opening into the flange openings. The spring assembly includes a spring disposed in the slot for biasing a head portion of a plunger, slidably disposed at each slot end, against the pin of the associated flange opening. Each plunger has spaced sidewalls slidably embracing the flange end faces for axially retaining the plungers and springs relative to the flange.

BRIEF DESCRIPTION OF THE DRAWINGS

The synchronizer mechanism of the invention is shown in the accompanying drawings in which:

FIG. 2 is a partially sectioned view looking along line 2—2 of FIG. 1;

FIG. 3 is a perspective view of a component in FIGS. 1 and 2;

FIG. 4 is a partial view of a toothed portion in the synchronizer of FIGS. 1 and 2;

FIGS. 7A, 7B and 7C are detailed views of a plunger component in FIGS. 1 and 2;

DETAILED DESCRIPTION OF THE DRAWINGS

Figure 1:
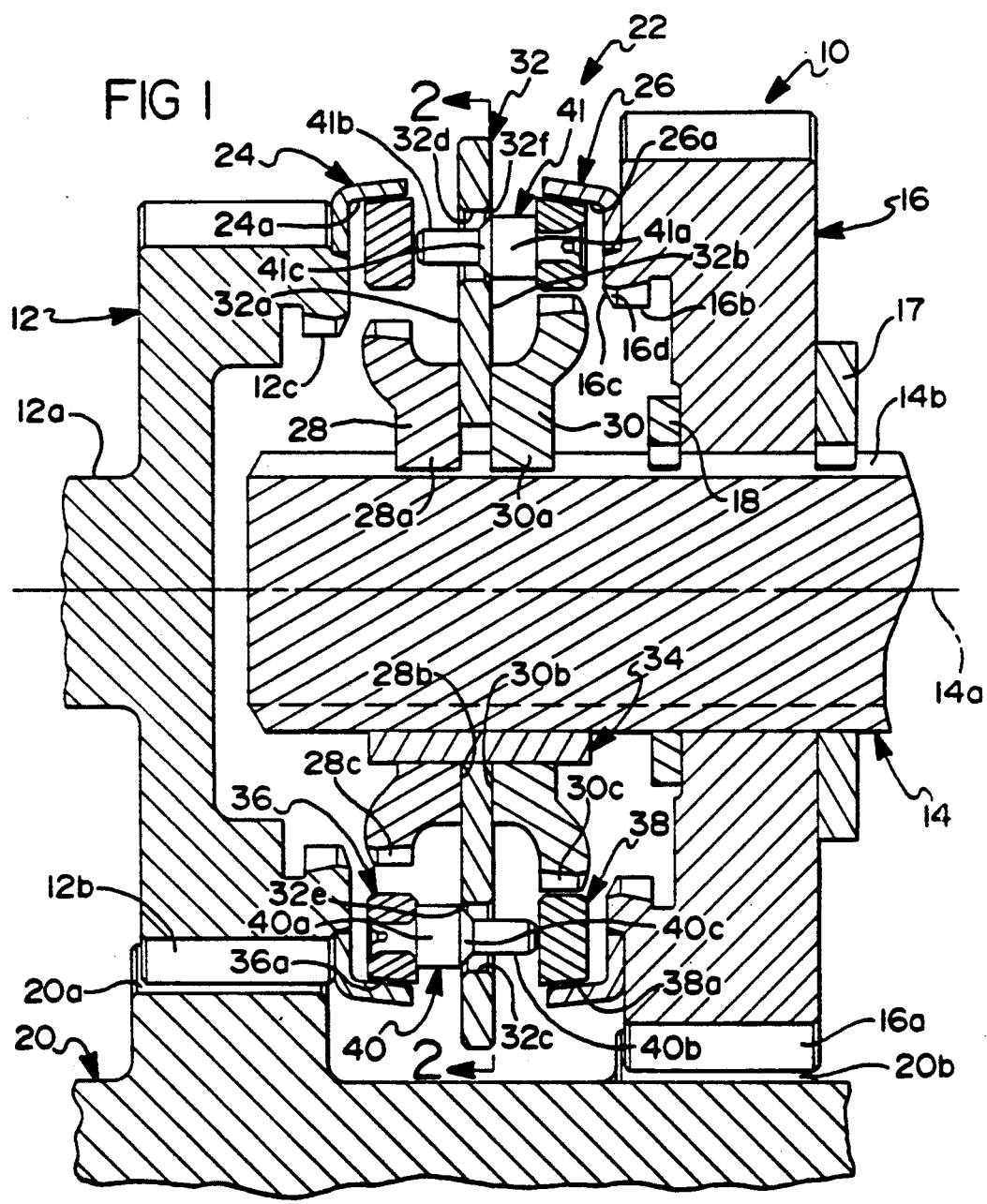
FIG. 1 is a sectional view of a double-acting synchronizer looking along line 1—1 of FIG. 2.

Looking first mainly at FIGS. 1 and 2, therein is shown a gear and synchronizer assembly 10 for an otherwise unshown transmission of the type intended for use in a land vehicle, particularly of the type used in heavy duty trucks. However, assembly 10 may be used in other applications. More specifically, assembly 10 is a two-speed range assembly including a first member of gear 12 connected to a shaft portion 12a rotatably driven by an unshown transmission such as disclosed in U.S. Pat. No. 4,388,843 which is incorporated herein by reference, an output shaft 14 normally connected to unshown ground engaging wheels of a vehicle, a second member or gear 16 mounted for rotation on and relative to shaft 14, thrust members 17,18 securing gear 16 against axial movement relative to shaft 14 in known manner, a partially shown countershaft 20 including gears respectively having teeth 20a,20b in constant mesh with teeth 12b,16a of gears 12,16 and a double-acting, one-way pin-type synchronizer mechanism 22. Gear 12, shaft portion 12a, the synchronizer mechanism 22, and gear 16 are concentric to an axis 14a of shaft 14. The shafts are mounted for rotation and secured against axial movement in known manner. When the vehicle is initially put in motion from rest, the range assembly is in a low speed ratio setting wherein gear 16 is positive clutched to shaft 14 by rightward pre-engagement of the synchronizer mechanism. When a predetermined vehicle speed is achieved and additional speed is desired, the range assembly is upshifted by leftward movement of the synchronizer mechanism to first declutch gear 16, then frictionally synchronize gear 12 with slower rotating shaft 14, and then positive clutch gear 12 with shaft 14. When a downshift of the range assembly is desired, the synchronizer mechanism is shifted rightward to first declutch gear 12, then frictionally synchronize gear 16 with faster rotating shaft 14, and then positive clutch gear 16 to shaft 14. Accordingly, while the vehicle is in motion gear 12 is always upshifted into and gear 16 is always downshifted into. During such shifting, gear 12 rotates faster than shaft 14 and shaft 14 rotates faster than gear 16.

The synchronizer mechanism 22 includes annular friction members 24,26 and annular jaw clutch members 12c,16b affixed to gears 12,16, jaw clutch members 28,30 having internal spline teeth 28a,30a slidably mating with external spline teeth 14b integrally formed with shaft 14 or otherwise affixed thereto, a radially extending shift flange 32, having axially oppositely facing faces 32a,32b sandwiched between axially facing surfaces 28b,30b of the jaw members 28,30, three H-shaped retainer members 34 (one of which is shown in perspective in FIG. 3) for securing the flange and jaw members against relative axial movement, annular friction members or rings 36,38 each including a set of three circumferentially spaced apart pins 40,41 extending rigidly and axially therefrom and through circumferentially spaced openings 32c,32d in the flange, and three spring assemblies 42 each including a spring 44 and two plungers 46 which bias pins 32c,32d circumferentially in opposite directions. The number of retainers 34, pins 40,41 and assemblies 42 may be more or less than disclosed herein.

As is readily seen, friction members 24,36 and 26,38 pair up to define friction clutches for synchronizing the gears to the shaft prior to engagement of the jaw clutches. Cone clutches are preferred; however, other types of friction clutches may be used. Friction members 24,26 may be affixed to the associated gears in any of several known ways, e.g., by welding, or, as is known in the art, they may be formed integral with the gears. Friction members 24,26 have internal cone friction surfaces 24a,26a which respectively mate with external cone friction surfaces 36a,38a. Members 24,26 and 36,38 also are respectively referred to as synchronizer cups and rings.

A wide range of cone angles may be used; herein, cone angles of seven and one-half degrees are employed. The friction surfaces 36a,38a and/or 24a,26a may be defined by any of several known friction materials affixed to the base member; herein, a pyrolytic carbon friction material, such as disclosed in U.S. Pat. Nos. 4,700,823; 4,844,218; and 4,788,548, is preferred. These patents are incorporated herein by reference.

The pins 40,41 respectively include major diameter portions 40a,41a having diameters slightly less than the diameter of their associated flange openings 32c,32d, reduced diameter portions 40b,41b, and conical blocker shoulders or surfaces 40c,41c extending radially outward from the pin axes and axially toward the associated friction ring at angles herein of about forty degrees relative to a line normal to the pin axis. The reduced diameter portions, when disposed within their respective flange openings, allow limited rotation of the pins and associated friction ring relative to the flange to effect nonconcentric positioning of the pins in the openings for engagement of the pin blocker shoulders with chambered blocker shoulders 32e,32f defined about the flange openings.

Referring now in greater detail to pins 40,41 and spring assemblies 42 and mainly to FIGS. 1, 2, 7 and 8, each spring assembly 42 is disposed in a slot 32g extending axially through the axially opposite end faces 32a,32b of the flange and having opposite ends opening into flange openings 32c,32d. Plungers 46, which are shown in detail in FIGS. 7A, 7B, and 7C, may be formed of a sheet metal material, but are preferably formed of a cast or compacted material such as steel to provide structural rigidity and surface hardness. Each plunger includes a blind bore 46a receiving one end of the associated spring 44, and a head portion defining flat angled surfaces 46b which ride up the blocker shoulders when the major diameter portion of the associated pin enters the opening to complete a shift. Springs 44 are preferably of the helical compression type. The bore is bounded on its sides by sidewalls 46d,46e which slidably cooperate with the slot walls and by sidewalls 46f,46g which slidably embrace flange faces 32a,32b or, as herein, guide grooves extending parallel to the slot for maintaining bind free alignment of the plungers in the grooves. Sidewalls 46f,46g have a circular shape (FIG. 7B) of diameter less than flange openings 32c,32d to facilitate assembly into the slots via the flange openings. With reference to FIG. 2, pins 40 are biased counterclockwise to the nonconcentric positions within openings 32c and pins are biased clockwise to the nonconcentric positions within openings 32d. With such nonconcentric positioning and assuming counterclockwise rotation of gears 12,16 and shaft 14 when viewed from the right in FIG. 1, pin blocker shoulders 40c are aligned for engagement whenever the synchronizer mechanism is upshifted by leftward actuation to connect gear 12 to shaft 14, and pin blocker shoulders 41c are aligned for engagement with flange blocker shoulders 32f whenever the synchronizer mechanism is downshifted by rightward actuation to connect gear 16 to shaft 14.

As previously mentioned, jaw members 28,30 include internal spline teeth 28a,30a slidably mating with external spline teeth 14b affixed to the shaft. The external splines have involute flank surfaces 14c extending parallel to the shaft axis and the mating thereof with flank surfaces of the jaw member splines prevents relative rotation therebetween. H-shaped members 34 each include end portions 34a,34b, which react against jaw member surfaces 28c,30c, and a center portion 34c which interconnects the end portions. Jaw member surface 30c is partially shown in FIG. 2 with end portion 34b thereon. The center portion extends snugly through axially extending slots 28d,30d in the jaw members and freely through scallop-like openings 32h which allow rotational movement of the flange relative to the jaw members and shaft for reasons explained herein after.

Figure 6A:
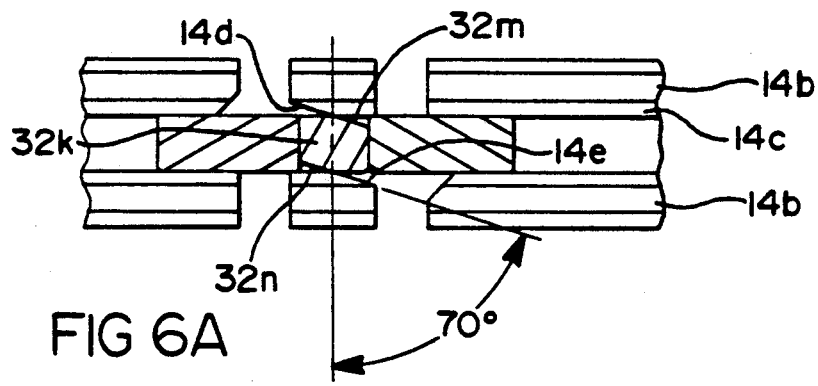
FIGS. 6A, 6B and 6C are sectional views of portions of the teeth looking along curved line 6—6 of FIG. 4.

As best seen in FIGS. 4, 6A, 6B, 6C, portions of shaft teeth flanks 14c, in both axial directions from the FIGS. 1 and 6A neutral position of flange 32, are modified to provide one or more ramp surfaces which cooperate with a like number of ramp surfaces defined by internal teeth 32k extending radially inward from flange 32 and into the axially extending spaces between shaft splines 14b. The ramp surfaces allow limited rotation of the flange relative to jaw members 28,30 and shaft 14, and react synchronizing torque from the cone clutches to provide an additive axial self-energizing force for increasing the engaging force of the cone clutch initially engaged by a shift force applied to flange 32, thereby increasing the synchronizing torque provided by the cone clutch. Ramp surfaces may be provided for increasing synchronizing force for one or both gears and/or for increasing synchronizing force in response to torque in either direction, as is encountered for up and down shifts. Herein, the modified portions of teeth 14b have ramp surfaces 14d,14e which respectively react against ramp surfaces 32m,32n on flange teeth 32k. Ramp surfaces 14d,32m provide the additive axial force to increase or assist the synchronization rate of gear during upshift into gear 12. Ramp surfaces 14e,32n provide the additive axial force to increase or assist the synchronization rate during downshift into gear 16. The angles of the ramp surfaces may be varied to provide different amounts of additive axial force for up and down shifts. For example, in applications where downshifts require more effort, the angles of ramps 14e,32n may be configured to provide more additive force than ramps 14d, 32m. Preferably, the ramp angles are such that shift feel and time are substantially the same for up and down shifts.

Figure 9:
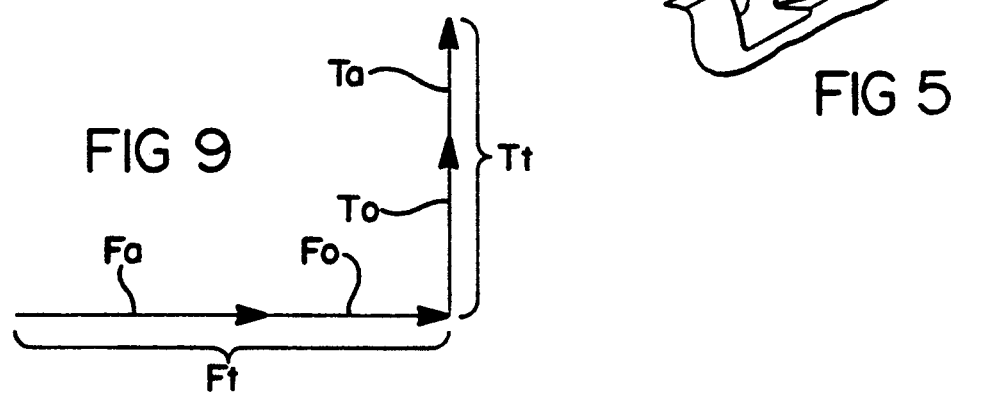
FIG. 9 is a graphical representation of axial force and torque acting on a shift flange of the synchronizer.

Flange 32 is shown in the neutral position in FIGS. 1 and 6A. However, as previously mentioned, flange 32 is either actuated right or left and only passes through the neutral position when up and down shifts are being effected. When it is desired to shift from one gear to the other, an appropriate and unshown shift mechanism connected to the outer periphery of flange 32 in known manner, moves the flange axially along the axis of shaft 14 either left to couple gear 12 or right to couple gear 16. The shift mechanism may be manually moved by an operator through a linkage system, may be selectively moved by an actuator, or may be moved by means which automatically initiate shift mechanism movement and which also control the magnitude of the force applied by the shift mechanism. Whether manually or automatically applied, the force is applied to flange 32 in an axial direction and is represented by the length of arrow $F_o$ in FIG. 9.

When a downshift is to be effected, initial axial movement of flange 32 by the shift force $F_o$ is transmitted to pins 41 by blocker shoulders 41c,32f to effect initial frictional engagement of cone surface 38a with cone surface 26a. The initial engagement force of the cone surfaces is, of course, a function of the force of springs 44 and the angles of the blocker shoulders. The initial frictional engagement (provided an asynchronous condition exists and momentarily ignoring the effect of the self-energizing ramps) produces an initial cone clutch engaging force and synchronizing torque $T_o$ in a clockwise direction. The synchronizing torque and the force of springs 44 allow the full shift force $F_o$ on flange 32 to be transmitted to friction ring 38 via the blocker shoulders, whereby the cone clutch is engaged by the full force of the shift force $F_o$ and to provide a resultant operator synchronizing torque $T_o$. This shift force synchronizing torque $T_o$ is represented by arrow $T_o$ in FIG. 9. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby blocker shoulders 41c,32f move the pins into concentric relation with openings 32d to allow continued axial movement of the flange and engagement of the external jaw teeth 30d of jaw member 30 with internal jaw teeth 16c of jaw member 16b. As is known in the prior art and as is specified by reference numbers only for jaw member 16b, the lead portions of the jaw teeth have rake leading edges 16c to reduce tooth damage during initial contact, and have chamfer or wedge faces 16d to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number of rotational clocking degrees necessary to matingly align the jaw teeth. Accordingly, the jaw teeth are preferably disposed about as large a diameter as is practicable. An upshift into gear 12 is substantially the same as the downshift into gear 16.

Still ignoring the effects of the self-energizing ramps, cone clutch torque provided by the force $F_o$ is expressed by equation (1).

$$T_o = F_o R_c \mu_c / \sin \alpha \tag{1}$$

where:

$R_c$=the mean radius of the cone friction surface,
$\mu_c$=the coefficient of friction of the cone friction surface, and
$\alpha$=the angle of the cone friction surfaces, herein 7.5 degrees.

Figure 6B:
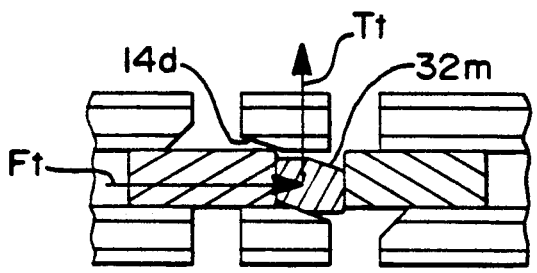
Figure 8:
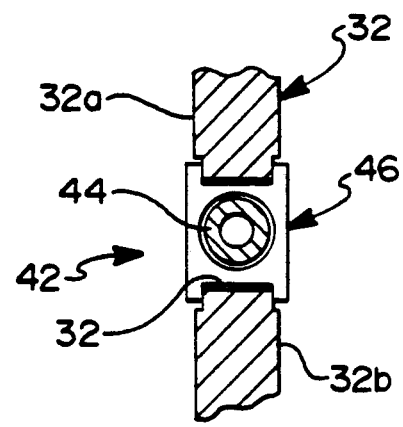
FIG. 8 is a sectional view looking along line 8—8 of FIG. 2.
Figure 6C:
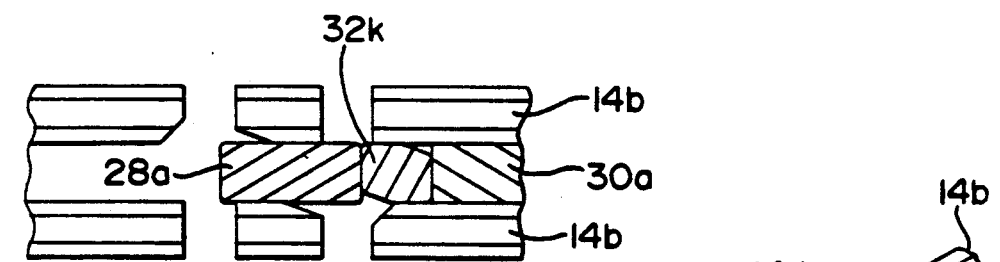

Looking now at the effects of the self-energizing ramps and referring particularly to FIGS. 6, the synchronizing torque $T_o$, due to the operator applied axial shift force $F_o$, is of course transmitted to flange 32 by pins 40 and is reacted to shaft 14 across the self-energizing ramp surfaces. The self-energizing ramp surfaces limit rotation of the flange relative to shaft 14 and jaw members 28,30, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. FIG. 6A illustrates the position of the self-energizing ramp surfaces and the position of the jaw member splines 28a,30a to the shaft splines 14b while shift flange 32 is in the neutral position corresponding to the position of FIG. 1. FIG. 6B illustrates a position of the ramps and splines while gear 16 is being synchronized by engaged cone surfaces 26a,38a. The engaged cone surfaces are producing a synchronizing torque in a direction which has effected engagement of flange member ramp surfaces 32n with shaft ramp surfaces 14e. Hence, the sum of the axial forces for engaging the cone clutch are $F_o$ plus $F_a$ and the sum of the synchronizing torques being produced by the cone clutch are $T_o$ plus $T_a$, as graphically shown in FIG. 9. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected the force $F_a$ will rapidly and uncontrollably increase independent of the force $F_o$, thereby driving the cone clutch toward lockup. Self-locking rather than self-energizing decreases shift quality or feel, may over stress synchronizer components, may cause over heating and rapid wear of the cone clutch surfaces, and may even override operator movement of the shift lever.

The main variables for calculating self-energizing ramp angles $\theta$ and for providing additive axial forces $F_a$, which increase and decrease in proportion to operator forces $F_o$, are cone clutch angle $\alpha$, cone clutch coefficient of friction $\mu_c$, mean radii ratio $R_c$ of the cone clutch and $R_r$ of the self-energizing ramps, ramp coefficient of friction $\mu_r$, and pressure angle $\phi$ of the self-energizing ramps. The pressure angle $\phi$ may be zero.

Figure 5:
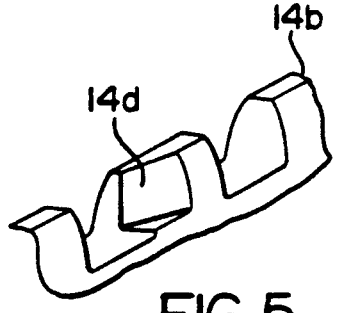
FIG. 5 is a perspective view of a portion of a tooth in FIG. 4.

Herein, the ramps have an involute profile, as may be seen in FIG. 5, and have a pressure angle of 20 degrees.

The total synchronizing torque $T_t$ produced by the cone clutch is:

$$T_t = F_t R_c \mu_c / \sin \alpha \tag{2}$$

where:

$$T_t = T_o + T_a \tag{3}$$

and $$F_t = F_o + F_a \tag{4}$$

The equation for the axial additive force $F_a$, which is given without derivation, is:

$$F_a = F_{tan} \left[ \frac{\cos\theta - \mu_r \sin\theta/\cos\phi}{\sin\theta + \mu_r \cos\theta/\cos\phi} \right] \tag{5}$$

where the ramp angle $\theta$ is measured from a plane normal to shaft axis 14a, and $F_{tan}$ acts on the ramp and is the tangential force component of torque $T_t$ at $R_r$. $T_t$ and $F_{tan}$ for one torque direction are respectfully represented by like referenced arrows in FIG. 4. Therefore, $$F_{tan} = T_t / R_r \tag{6}$$

Substituting equations (5) and (6) into equation (4) and solving for $F_t$ gives $$F_t = \frac{F_o}{1 - \left[ \dfrac{\cos\theta - \mu_r \sin\theta/\cos\phi}{\sin\theta + \mu_r \cos\theta/\cos\phi} \right] \left[ \dfrac{R_c \mu_c}{R_r \sin\alpha} \right]} \tag{7}$$

$F_t/F_o$ is defined as a boost or self-energizing ratio. The greater the boost ratio the greater the total synchronizer $T_t$ for a given operator force $F_o$. Boost ratios equal to one correspond to ramp angles $\theta$ of 90 degrees; such angles are parallel to the shaft splines and provide no self-energizing. As $\theta$ decreases, the boost ratio increases. Boost ratios from 1:1 to about 5:1 have been employed. However, boost ratios greater than 1:1 and less than 5:1 are preferred. $F_t/F_o$ tends to infinity as the denominator of equation (7) tends to zero. This of course occurs when the minus term in the denominator of equation (7) approaches one. Accordingly, the ramps are self-energizing and not self-locking when:

$$\left[ \frac{\cos\theta - \mu_r \sin\theta/\cos\phi}{\sin\theta + \mu_r \cos\theta/\cos\phi} \right] \left[ \frac{R_c \mu_c}{R_r \sin\alpha} \right] < 1 \tag{8}$$

For a given synchronizer geometry, equation (8) may be simplified by setting $R_c$, $\mu_c$, $R_r$, $\alpha$ equal to a constant K, wherein:

$$\frac{R_c \mu_c}{R_r \sin\alpha} = \frac{1}{K} \tag{9A}$$

$$\frac{R_r \sin\alpha}{R_c \mu_c} = K \tag{9B}$$

Substituting either of equations (9) into equation (8), re-arranging and solving for ramp angles $\theta$ gives equation (10) which provides minimum angles $\theta$. Such minimum angles produce self-energizing forces $F_a$ which are proportional to operator forces $F_o$, which provide maximum controllable boost ratios, and which are not self-locking.

$$\theta > TAN^{-1}\left[\frac{1 - K\mu_r/\cos\phi}{K + \mu_r/\cos\phi}\right] \quad (10)$$

Keeping in mind that $\theta$ is measured from a plane normal to shaft axis 14a, increasing values of angles $\theta$ therefore provide decreasing values of forces $F_a$ and torque $T_a$, and of course decreasing values of torque $T_t$. Accordingly, as K increases, angles $\theta$ must decrease to prevent self-locking and to keep forces $F_a$ proportional to $F_o$, provided all other variables remain the same.

More specifically, to prevent self-locking and to keep forces $F_a$ proportional to $F_o$, minimum angles $\theta$ should increase:
as the ratio $R_c/R_r$ increases and/or,
as the cone angle $\alpha$ decreases and/or,
as the coefficient of clutch friction $\mu_c$ increases and/or,
as the ramp pressure angle $\phi$ increases and/or,
as the coefficient of ramp friction $\mu_r$ increases.

Also, when calculating minimum ramp angles for a so-called given geometry and a maximum desired boost ratio, a margin of safety is preferred to prevent self-locking or over boost due to manufacturing tolerances and due to normal wear of components.

Looking now at applications of synchronizer mechanisms 10 in a multi-ratio speed change transmission, as is known, the time required to synchronize a ratio gear decreases as the total synchronizing torque increases. Further, due to differences in reflected inertia, i.e., actual inertia of components being synchronized plus friction, the amount of work required to synchronize lower speed ratio gears is in general greater than that required for higher speed ratio gears; also, the amount of work required to synchronize a given ratio gear for downshifts is in general greater than that required for upshifts. Accordingly, when the synchronizer mechanisms disclosed herein are employed in a multi-ratio transmission, the mechanisms for lower speed ratio gears are preferably provided with higher boost ratios and the mechanisms for higher speed ratios are preferably provided with lower boost ratios. Also, for a given ratio gear, the boost ratio for downshifts is preferably greater than for upshifts. By so arranging the boost ratios, substantially equal shift or synchronizing times can be provided for all ratio gears of a transmission provided with the self-energizing synchronizer mechanisms. For the synchronizer mechanisms disclosed herein, the boost ratios are readily varied by varying the cone clutch angles $\alpha$, the radii ratio $R_c/R_r$, and the self-energizing ramp angles $\theta$.

As may be readily seen by reference to the drawings herein, flange 32 is disconnected from the torque path between shaft 14 and either of the ratio gears 12,16 when either of the jaw members 28,30 are engaged with jaw members of the associated gear. Accordingly, the relatively small and wear sensitive self-energizing ramps are never exposed to the deteriorating effects of the full torque loads of the ratio gears. This is particularly important as the self-energizing ramps are moved radially inward since the forces acting on the ramps increases with decreasing ramp radius relative to shaft axis 14a.

Further, due to radius differences, forces acting between jaw member splines 28a,30a and shaft splines 14b are greater than the forces acting between the jaw clutch teeth. Accordingly, the axial length of the spline connection between jaw member splines 28a,30a and shaft splines 14b are preferably greater than what is necessary for adequate strength for the jaw clutch teeth. This greater axial spline length connection is inherent in the disclosed embodiment without lengthening the stroke of the shift mechanism which moves flange 32 since flange 32 is not circumferentially fixed to jaw clutch members 28,30 or shaft 14; hence jaw member splines 28a,30a may continuously mate with shaft splines 14b. This is particularly important when a vehicle operator moves the shift mechanism via a manually operated shift lever in known manner. An example of such lever may be seen by reference to U.S. Pat. No. 3,850,047 which is incorporated herein by reference. Such levers are commonly of the first class lever type wherein increased shift stroke requires either increased operator movement of the shift lever or (by change the lever fulcrum) decreased force applied to the shift mechanism for a given operator shift effort.

An additional feature in synchronizer mechanism 22 is the use of the additive axial force $F_a$ to assist the shift force $F_o$ to effect unblocking of the blocker shoulders as synchronization is approached. This feature improves operator shift feel and, particularly during downshifts, decreases the time required to effect the unblocking portion of a shift. Herein, the feature is implemented when the axial lengths of the self-energizing ramp surfaces are long enough to remain active during the unblocking portion of the shift. Accordingly, as synchronization is approached, the axial additive force $F_a$ produced by the still engaged ramp surface is effective to assist the shift force $F_o$ acting on the shift flange.

A preferred embodiment of self-energizing synchronizer mechanism has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A pin-type synchronizer mechanism for first and second axially spaced apart members mounted for rotation about an axis of a shaft; the mechanism comprising:

first and second annular and axially spaced apart friction means respectively engagable for frictionally connecting the first and second members to the shaft in response to a shift force ($F_o$) effecting initial axial engaging movement of a radially extending flange from a neutral position toward the first and second friction means, respectively, the flange axially disposed between the friction means and drivingly connected to the shaft by connection means;

jaw clutch means for positive clutching the members to the shaft in response to further engaging movement of the flange;

each friction means including at least one pin rigidly extending axially therefrom and through circumferentially spaced openings in the flange, each pin having a reduced diameter portion allowing limited relative rotation between the flange and associated pin;

means biasing the pins circumferentially in opposite directions toward nonconcentric positions in the associated openings;

each opening and associated pin defining engagable blocker shoulders engagable during the nonconcentric position for transmitting the initial engaging movement of the flange and the shift force ($F_o$) to engage the friction means the associated pin extends from and for preventing the further engaging movement until substantial synchronization, the engaged friction means producing a synchronizing torque ($T_o$) reacting to the flange via the pins and in a direction for maintaining blocker shoulder engagement, the blocker shoulder having surfaces for producing a torque counter to the synchronizing torque for unblocking the engaged shoulders in response to substantial synchronization; characterized by:

the flange having a slot extending axially through axially opposite end faces of the flange and having opposite ends opening into the flange openings; and the means biasing including spring means disposed in the slot for biasing a head portion of a plunger slidably disposed at each slot end against the pin of the associated flange opening, each plunger having spaced sidewalls slidably embracing the flange end faces for axially retaining the plungers and spring means relative to the flange.

2. The synchronizing mechanism of claim 1, wherein:
at least one of the flange end faces includes guide means extending parallel to the slot and receiving a portion of one of the plunger sidewalls for maintaining alignment of the plunger in the groove.

3. The synchronizer mechanism of claim 1, wherein:
the flange connection means includes ramp means allowing limited rotational movement between the flange and shaft, the ramp means operative when engaged to react the synchronizing torque from at least one of the friction means for producing an additive axial force on the flange in the direction of the shift force engaging the friction means for further increasing the shift force engaging the friction means.

4. The synchronizer mechanism of claim 1, wherein:
the nonconcentric biasing of the pins positions the blocker shoulders associated with the pin extending from the first friction means for engagement when the first member rotates faster than the second member, and positions the blocker shoulders associated with the pin extending from the second friction means for engagement when the second member rotates slower than the shaft.

5. The synchronizer mechanism of claim 4, wherein:
the flange connection means includes ramp means allowing limited rotational movement between the flange and shaft, the ramp means operative when engaged to react the synchronizing torque from at least the second friction means for producing an additive axial force on the flange in the direction of the shift force engaging the second friction means for further increasing the shift force engaging the second friction means.

6. The synchronizer mechanism of claim 5, wherein:
a ratio of the additive and shift forces is greater than 1:1 and less than 5:1.

7. The synchronizer mechanism of claim 6, wherein:
the second friction means and ramp means have mean radii relative to the shaft axis, and a ratio of the second friction means and ramp means radii is in the range of greater than 1:1 and less than 4:1.

8. The synchronizer mechanism of claim 3, wherein:
the self-energizing ramp surfaces remain engaged during the unblocking of the engaged blocker shoulders.

* * * * *